No. 638,532. Patented Dec. 5, 1899.
C. B. WEAVER.
FLEXIBLE METALLIC CONNECTION FOR TRAIN PIPES.
(Application filed Feb. 17, 1898.)
(No Model.) 2 Sheets—Sheet 1.
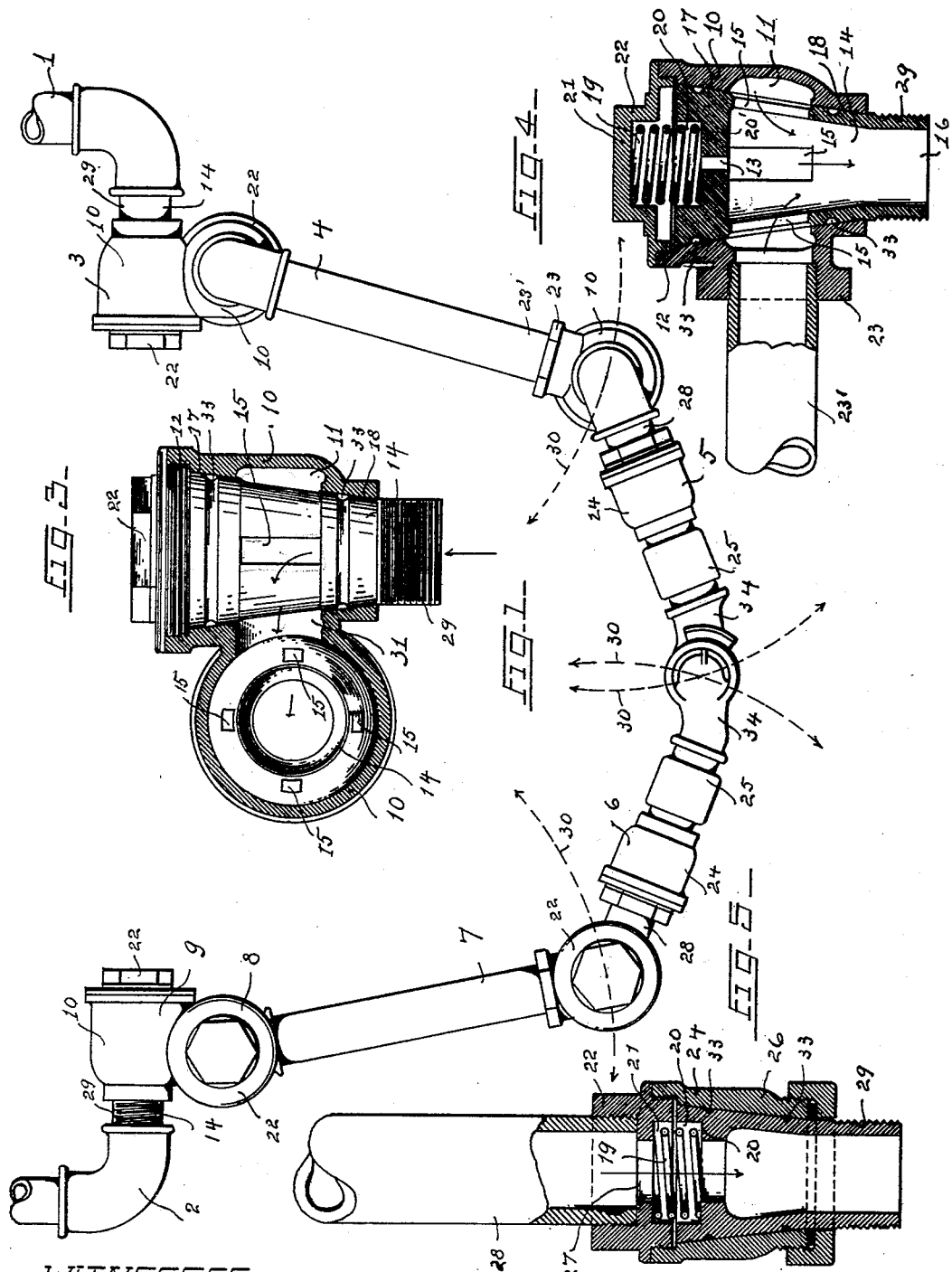
WITNESSES
Herman H. Martin
Jeanetta Hislop
INVENTOR
Charlie B Weaver
By William Webster
Atty

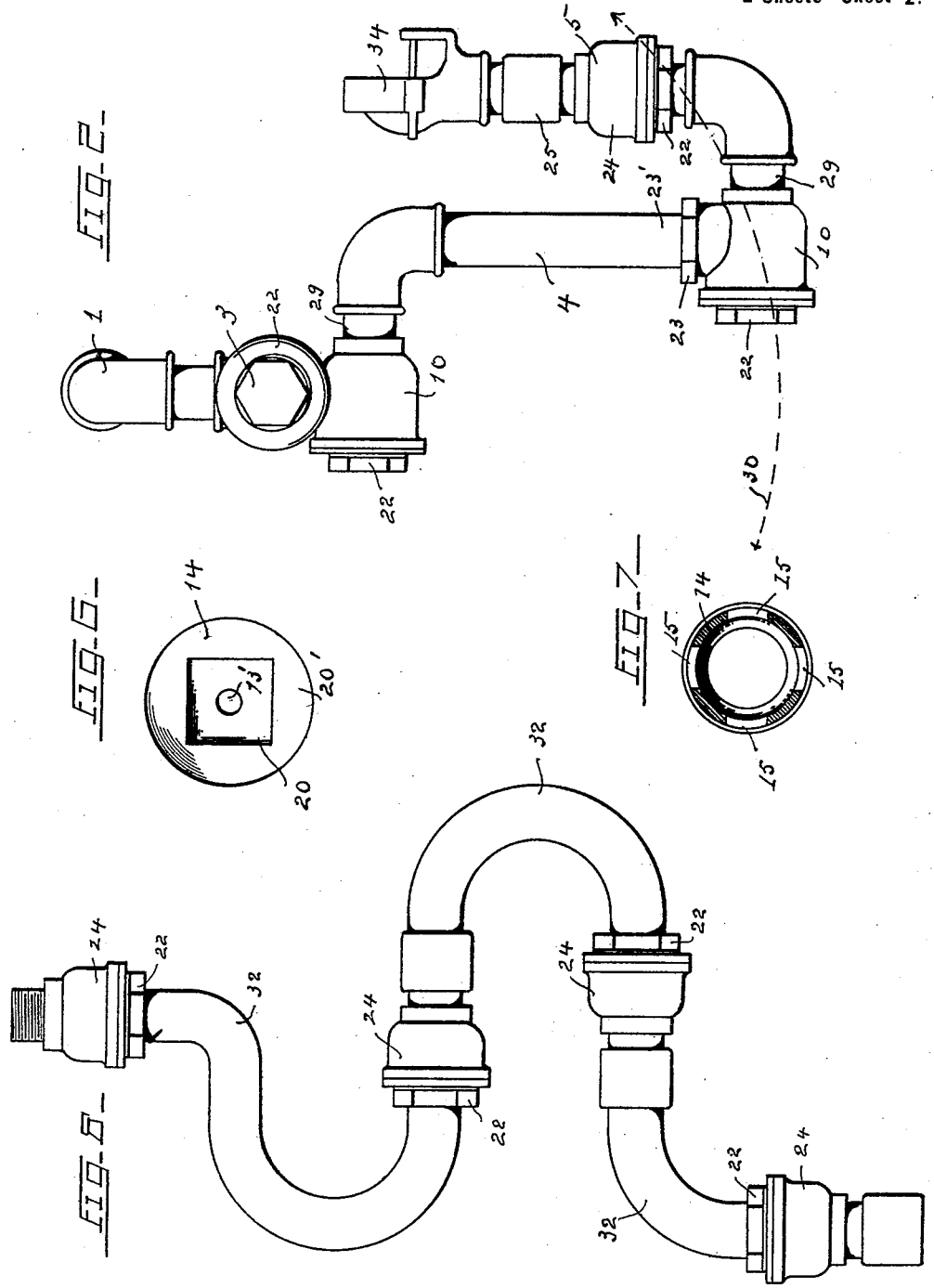

UNITED STATES PATENT OFFICE.

CHARLIE B. WEAVER, OF HILLSDALE, MICHIGAN.

FLEXIBLE METALLIC CONNECTION FOR TRAIN-PIPES.

SPECIFICATION forming part of Letters Patent No. 638,532, dated December 5, 1899.

Application filed February 17, 1898. Serial No. 670,693. (No model.)

*To all whom it may concern:*

Be it known that I, CHARLIE B. WEAVER, of Hillsdale, county of Hillsdale, and State of Michigan, have invented certain new and useful Improvements in Flexible Metallic Connections for Train-Pipes; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a flexible metallic connection for train-pipes, and has for its object to provide a metallic flexible connection between the rigid pipes of the several cars comprising a train, whereby the variation incident to the character of the road-bed, as well as in the act of retardation or free travel of the cars, shall be compensated for.

I will describe my invention as in particular use for air-brake pipe-coupling, although I wish it understood that this is simply one use to which the flexible metallic connection may be adapted, as it is equally as well adapted to serve in steam connections in train-service or in water connection, and, in fact, for a variety of uses.

Referring particularly to its adaptation for train-service in air-brake coupling, I have attempted to overcome a great objection heretofore existing in the flexible portion of the train connection in coupling cars wherein it has been usual to employ a rubber hose. It is well known that in the employment of rubber hose the heat incident to friction as well as buckling occasioned by flexure, soon disintegrates the fiber of the hose, and has resulted very frequently in bursting of the hose, and consequently causing the air-brakes to act, due to leakage at the point of fracture. This has been a frequent cause of accident, due to failure of proper action of the brakes. I have discovered that to obviate this contingency it is possible, and, in fact, necessary, to provide a metallic flexible connection between the cars. In order to make this metallic connection as coactive with the varying distances as between the coupled cars determined in limit by the variation that exists as between a pull by the locomotive and a retardation on the part of the locomotive, it is necessary that there shall be a pivotal provision whereby the sections of pipe may collapse pivotally and shall also have an axial movement radially from the main train-pipe. It is also necessary that absolute provision be made for preventing leakage in the event of either the vertical, pivotal, or axial movement of the sections. I have accomplished these several features of value in the invention as herein set forth diagrammatically, in which—

Figure 1 is an elevation of a complete coupling as interposed between two cars, the several arrows indicating in either direction the possible pivotal movements of the several sections comprising the connection. Fig. 2 is a front elevation of one section of the pipe connection. Fig. 3 is a longitudinal vertical section through the casing of one of the pivotal connections, showing the conical plug in full lines and a duplex member in central horizontal section. Fig. 4 is a longitudinal vertical section of a connection taken through the center of the connection and a portion of the pipe. Fig. 5 is a central vertical section through the connection, showing a straightway connection of a pipe. Fig. 6 is a top plan view of the conical tubular trunnion of the flexible connection. Fig. 7 is a horizontal section of the same, and Fig. 8 is an elevation showing the application of my invention in continuous extension of the articulation of the sections.

In carrying out my invention I attach the device to the main train-pipe by suitable connections with pipe 1, and provide for circulation through the flexible connections and a continuing pipe 2 to the adjacent car or cars, and provide a flexible metallic connection between pipes 1 and 2 by means of articulated sections 3, 4, 5, 6, 7, 8, and 9, this being the preferred number of sections to carry out the object of my invention in coupling two cars together for effective operations, although, as will be readily understood, my invention being adapted to various uses, the number of sections may be varied at will.

The essential feature of my invention resides in the peculiar form of flexible connection, in which I employ a casing 10 of internal conical conformation having a central annular enlargement 11 and an internally-screw-threaded top portion 12. Seated within the casing is a conical hollow trunnion 14, closed at the base 20' and is provided with a plurality of openings 15, extending diametrically of its length, coinciding with the annular enlargement 11, whereby a fluid-pressure introduced into the casing 10, and consequently into the annulus 11, finds ready access into the hollow trunnion 14 through the opening 15, or vice versa. A fluid-pressure is introduced through the openings 15 into the annulus 11 and from thence to its pipe connections.

The trunnion 14 finds a conical seat in the casing 10 at the points—to wit, at the upper portion 17 and lower portion 18—and is closely seated initially by the pressure of a coiled spring 19, housed in a recess 20 of the trunnion and in a recess 21 of an externally-screw-threaded cap 22, screwed into the top of the casing, and to provide an equilibrium of pressure the trunnion is perforated at 13, thereby allowing the pressure of the fluid to pass through the perforation 13 and cushion upon the cap, with the effect of constantly urging the trunnion upon its conical seats. I have also provided a tubular projection 23 at right angles to the body of the shell and integral therewith and is internally screw-threaded for the introduction of a pipe connection 23'. The articulated sections 6 of the coupling are provided with straightway unions 24, as shown in Fig. 5, whereby the coupling portions 25 are adapted to revolve, and thereby compensating for variations and alining the connecting portions of the coincident coupling members. This union is shown in Fig. 5 and comprises a shell portion 26, wherein is located and revolubly seated a conical trunnion 27, normally held to its seat by a spring 19, held in the recess 20, formed in the base 20' of the conical trunnion, and the recess 21, formed in the closure-plug 22'. The closure-plug is provided with a central aperture 27, internally screw-threaded for the pipe connections 28. The perforation 13 in the base of the trunnion 14 is enlarged to form unobstructed passage for the fluid.

In order to provide for attaching pipe connections with the lower screw-threaded end 29 of the trunnion, the recess 20 in the base 20' of the trunnion is made square, whereby by means of a lever having a squared end I may hold the trunnion from revolution while securing a pipe connection to the end 29 of the trunnion.

The double-pointed arrows 30 30 throughout the several views will illustrate the pivotal movement of the sections when coupled together by means of the hollow conical recessed trunnions.

In Fig. 3 there is shown a duplex casing 10, at right angles to each other and having a port 31 communicating with the annular chambers 11, formed centrally of the body 10 of the shell. The duplex articulated trunnions are preferably connected to the terminals of the service-pipes 1 2, as shown.

In the modification shown in Fig. 8 I employ a plurality of curved or bent pipe-sections 32 and articulate the sections by means of a trunnion and casing. (Illustrated in Fig. 5.) I have also made provision for lubricating the conical trunnions by forming a plurality of grooves 33 or depressions upon the periphery of the trunnion, coinciding with the seat portions of the casing, whereby upon filling the grooves with a plastic lubricating medium, such as the dope used for lubricating machinery, previous to the insertion of the trunnion within the casing the conical coincident bearing-surfaces are kept lubricated. The interposition of a plastic compressible lubricating medium between the conical seat and the coincident trunnion will also aid toward providing a tight seal or seat, and thereby preventing the escape of fluid. It will also be obvious that the conical trunnion is continually urged upon its seat by the pressure within the casing, which is exerted upon the base of the trunnion, with the additional outward-urging pressure which is exerted by the spring interposed between the trunnion and the closure-plug of the casing, and thereby the revoluble movement of the trunnion will reseat itself by coincident simultaneous grinding of the seat and the trunnion.

It will be understood that I prefer to use the ordinary air-brake hose-coupling 34 now in common use, as this particular form of uniting the metallic flexible connection between the train-pipes may be of any form. It will be seen that in this construction I have provided for a vertically-foldable relation of the sections connecting two cars and also for the lateral movement incident to the travel of the train around curves or in the necessity of folding the connection upon the rear end of the last car and that by the use of the metallic flexible connection all danger of fracture is avoided, thereby precluding the possibility of accident by failure of the brakes to operate properly by reason of fracture of the hose.

What I claim is—

1. A flexible connection for pipes comprising a casing, a hollow trunnion seated within the casing, a pipe connection with the casing and with the trunnion, a recess in the head of the trunnion and a cap secured upon the casing forming a space between the cap and the head of the trunnion, a spring interposed between the head of the trunnion and the cap and an opening in the head of the trunnion forming a communication between the interior opening in the trunnion and the space between the head of the trunnion and the cap.

2. A flexible connection for pipes comprising a casing a tapering hollow trunnion seated in the casing, annular grooves near each end of the trunnion and extending around the same exteriorly and plastic lubricant filling the grooves to form a lubricating medium and a seal between the casing and trunnion near each end of the same.

3. A flexible metallic connection for pipes comprising a casing having two conical seats formed therein with their axes arranged at right angles, correspondingly-tapered hollow trunnions journaled in said seats and pipes connected to the small ends of said trunnions communicating with each other through said casing.

4. A swivel connection for pipes comprising a casing having a tapering bore extending therethrough, a conical hollow trunnion journaled in said bore having a nipple at its small end projecting out from the casing, a retaining-bearing for said trunnion secured in the large end of said bore, and a spring interposed between said bearing and the trunnion.

In testimony that I claim the foregoing as my own I hereby affix my signature in presence of two witnesses.

CHARLIE B. WEAVER.

Witnesses:
WILLIAM WEBSTER,
JEANETTA HISLOP.